(12) United States Patent
Jeon et al.

(10) Patent No.: US 9,376,120 B2
(45) Date of Patent: Jun. 28, 2016

(54) SYSTEM AND METHOD OF CONTROLLING STARTING OF VEHICLE

(71) Applicants: Hyundai Motor Company, Seoul (KR); Kia Motors Corporation, Seoul (KR)

(72) Inventors: Byeong Wook Jeon, Seoul (KR); Dong Hoon Jeong, Osan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

(21) Appl. No.: 14/297,318

(22) Filed: Jun. 5, 2014

(65) Prior Publication Data
US 2015/0158498 A1    Jun. 11, 2015

(30) Foreign Application Priority Data
Dec. 5, 2013    (KR) .......................... 10-2013-0150692

(51) Int. Cl.
*B60W 50/00*    (2006.01)
*B60W 10/04*    (2006.01)
*B60W 50/10*    (2012.01)
*B60W 10/06*    (2006.01)
*B60W 10/10*    (2012.01)
*B60W 30/18*    (2012.01)

(52) U.S. Cl.
CPC ............... *B60W 50/00* (2013.01); *B60W 10/04* (2013.01); *B60W 10/06* (2013.01); *B60W 10/10* (2013.01); *B60W 30/18027* (2013.01); *B60W 50/10* (2013.01); *B60W 2520/10* (2013.01); *B60W 2540/10* (2013.01); *B60W 2550/142* (2013.01); *B60W 2710/0666* (2013.01); *B60W 2710/1005* (2013.01)

(58) Field of Classification Search
CPC ..... B60W 50/00; B60W 10/04; B60W 10/06; B60W 10/10; B60W 50/10; B60W 2520/10; B60W 2550/142
See application file for complete search history.

(56) References Cited

U.S. PATENT DOCUMENTS

| 8,694,208 | B2 * | 4/2014 | Yokota ................ B60T 8/17554 180/9.38 |
| 8,924,074 | B2 * | 12/2014 | Komori ................ B60W 40/09 701/33.4 |
| 9,098,952 | B2 * | 8/2015 | Jung ...................... B60W 10/10 |
| 2010/0274440 | A1 * | 10/2010 | Kim ........................ G07C 5/008 701/31.4 |

FOREIGN PATENT DOCUMENTS

| JP | 2008-100586 A | 5/2008 |
| JP | 2011-236946 A | 11/2011 |
| JP | 2012-153175 A | 8/2012 |
| KR | 1999-0050643 A | 7/1999 |
| KR | 10-2002-0029111 A | 4/2002 |
| KR | 10-0448769 B1 | 9/2004 |

\* cited by examiner

*Primary Examiner* — Hieu T Vo
(74) *Attorney, Agent, or Firm* — Morgan, Lewis & Bockius LLP

(57) ABSTRACT

A system and a method of controlling starting of a vehicle may include: an accelerator pedal position sensor detecting position of an accelerator pedal; a vehicle speed sensor detecting vehicle speed; and a controller receiving information on input variables including the position of the accelerator pedal and the vehicle speed from the accelerator pedal position sensor and the vehicle speed sensor, determining a short term driving tendency index of a driver based on the information, and performing starting control according to the short term driving tendency index.

17 Claims, 4 Drawing Sheets

FIG. 4

| object to be controlled | | first pattern | second pattern |
|---|---|---|---|
| engine | torque map | HIGH $Tq_1 < Tq_2$ $Tq_1$ | LOW $Tq_2$ |
| | torque filter | HIGH $Tq_2 < Tq_1$ $\Delta Tq_1$ | LOW $\Delta Tq_2$ |
| transmission | shift-speed | first forward speed | second forward speed |

SYSTEM AND METHOD OF CONTROLLING STARTING OF VEHICLE

CROSS-REFERENCE TO RELATED APPLICATION

The present application claims priority to Korean Patent Application No. 10-2013-0150692 filed on Dec. 5, 2013, the entire contents of which is incorporated herein for all purposes by this reference.

BACKGROUND OF THE INVENTION

1. cl Field of the Invention

The present invention relates to a system and a method of controlling starting of a vehicle. More particularly, the present invention relates to a system and a method of controlling starting of a vehicle that changes starting pattern according to a gradient of a road and a short term driving tendency index of a driver and performs a starting control according to the changed starting pattern.

2. Description of Related Art

Customer satisfaction related to driving performance of a vehicle depends on how precisely the vehicle runs in accordance with a tendency of the customer. While tendencies of the customers vary, however, performance characteristic of the vehicle is set to one performance characteristic in the same vehicle model. Therefore, reaction of the vehicle may not coincide with the tendency of the customer. Accordingly, the customer often lodges a complaint against the driving performance of the vehicle. That is, if the driving tendency of the customer is grasped and a shift of the vehicle is controlled to coincide with the tendency of the customer, the customer satisfaction related to the driving performance may be maximized.

Meanwhile, starting is very important for estimating driving performance of the vehicle. A starting control means a control of an engine and a transmission which is performed when the vehicle begins to run in a stopped state. Quick increase of torque and quick reactivity are very important factor for maximizing acceleration performance of the vehicle in the starting control. However, if the torque is increased too fast, start-up feel may be deteriorated.

According to a conventional starting control, engine torque is controlled according to a predetermined torque filter and a predetermined torque map at a predetermined shift-speed regardless of a driving tendency of a driver. Therefore, a sporty driver may feel delay in the starting and a mild driver may feel embarrassment in the starting according to the conventional starting control.

Meanwhile, although the start-up feel is greatly related to a gradient of a road as well as the driving tendency of the driver, the conventional starting is not controlled considering the gradient of the road.

Therefore, it is necessary to differentiate the starting control according to the driving tendency of the driver and the gradient of the road.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method of controlling starting of a vehicle having advantages of satisfying a driver's demand by performing a suitable starting control according to driving tendency index of a driver and a gradient of a road.

In an aspect of the present invention, a system of controlling starting of a vehicle may include an accelerator pedal position sensor detecting a position of an accelerator pedal, a vehicle speed sensor detecting a vehicle speed, and a controller receiving information on input variables including the position of the accelerator pedal and the vehicle speed from the accelerator pedal position sensor and the vehicle speed sensor, determining a short term driving tendency index of a driver based on the information, and performing starting control of the vehicle according to the short term driving tendency index.

The system ma may further include a gradient detector detecting a gradient of a road, wherein the controller determines the short term driving tendency index of the driver further considering the gradient of the road and performs the starting control according to the short term driving tendency index and the gradient of the road.

The controller performs the starting control according to a first pattern when the short term driving tendency index is larger than or equal to a predetermined short term driving tendency index.

In the first pattern, the controller controls a shift-speed to be adjusted to a first forward speed and an engine torque using a sporty torque map and a sporty torque filter.

The controller performs the starting control according to a first pattern when the short term driving tendency index is smaller than a predetermined short term driving tendency index and the gradient of the road is larger than or equal to a predetermined gradient of the road.

The controller performs the starting control according to a second pattern when the short term driving tendency index is smaller than a predetermined short term driving tendency index and the gradient of the road is smaller than a predetermined gradient of the road.

In the second pattern, the controller controls a shift-speed to be higher than or equal to a second forward speed and an engine torque using a normal torque map and a normal torque filter.

The predetermined gradient of the road is determined according to the short term driving tendency index.

In another aspect of the present invention, a method of controlling starting of a vehicle may include detecting input variables, determining a short term driving tendency index based on the input variables, determining, when a starting condition is satisfied, whether the short term driving tendency index is larger than or equal to a predetermined short term driving tendency index, and performing starting control according to a first pattern when the short term driving tendency index is larger than or equal to the predetermined short term driving tendency index.

The method may further include determining whether a gradient of a road is larger than or equal to a predetermined gradient of the road when the short term driving tendency index is smaller than the predetermined short term driving tendency index, and performing the starting control according to the first pattern when the gradient of the road is larger than or equal to the predetermined gradient of the road.

The method may further include performing the starting control according to a second pattern when the gradient of the road is smaller than the predetermined gradient of the road.

The input variables may include a position of an accelerator pedal, a change rate of the position of the accelerator pedal, a vehicle speed, and the gradient of the road.

The predetermined gradient of road is determined according to the short term driving tendency index.

In further another aspect of the present invention, a system of controlling starting of a vehicle may include a gradient detector detecting a gradient of a road, and a controller receiving information on the gradient of the road from the gradient detector and performing starting control according to the gradient of the road.

The controller performs the starting control according to a first pattern when the gradient of the road is larger than or equal to a predetermined gradient.

The controller performs the starting control according to a second pattern when the gradient of the road is smaller than the predetermined gradient.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a table of starting patterns according to an exemplary embodiment of the present invention.

Figure 1:
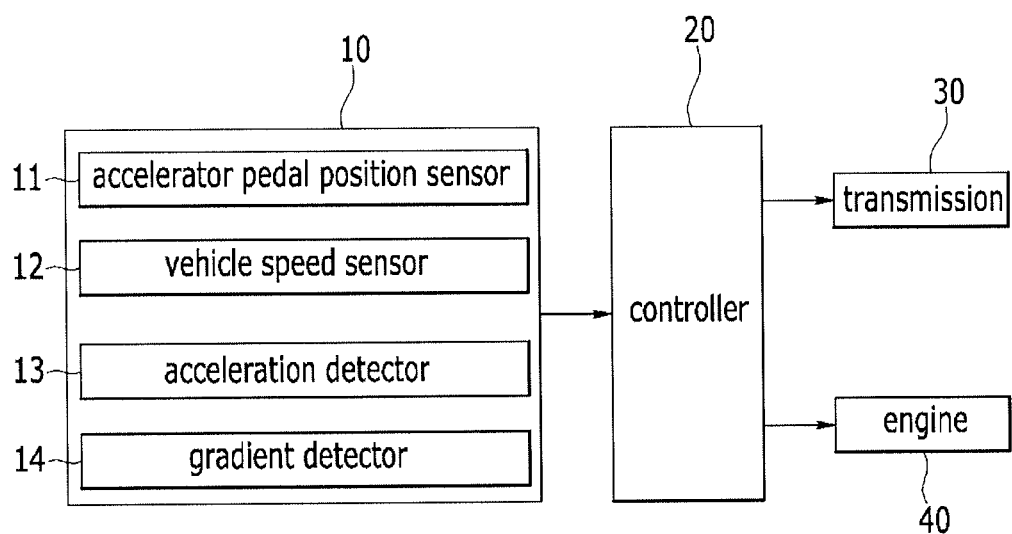
FIG. 1 is a block diagram of a system of controlling starting of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a block diagram of a system of controlling starting of a vehicle according to an exemplary embodiment of the present invention.

As shown in FIG. 1, a system of controlling starting of a vehicle according to an exemplary embodiment of the present invention includes a data detector 10, a controller 20, a transmission 30, and an engine 40.

The data detector 10 detects data for determining a short term driving tendency of a driver and controlling a starting of the vehicle, and the data detected by the data detector 10 is transmitted to the controller 20. The data detector 10 includes an accelerator pedal position sensor 11, a vehicle speed sensor 12, an acceleration detector 13, and a gradient detector 14.

The accelerator pedal position sensor 11 detects a degree with which a driver pushes an accelerator pedal. That is, the accelerator pedal position sensor 11 detects the data related to driver's acceleration will.

The vehicle speed sensor 12 detects a vehicle speed, and is mounted at a wheel of the vehicle. On the contrary, the vehicle speed may be calculated based on a global positioning system (GPS) signal received by a GPS.

Meanwhile, a target shift-speed may be calculated by using a shift pattern based on the signal of the accelerator pedal position sensor 11 and the signal of the vehicle speed sensor 12, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, current applied to a plurality of synchronizer devices and actuators is controlled in a double clutch transmission.

The acceleration detector 13 detects an acceleration of the vehicle. An acceleration sensor may be used as the acceleration detector 13. In addition, the acceleration detector 13 may be provided in the controller 20 and may calculate the acceleration based on the vehicle speed detected by the vehicle speed sensor 12.

The gradient detector 14 detects a gradient of a road on which the vehicle is currently positioned or around the vehicle. A gradient sensor or a navigation device may be used as the gradient detector 14. The navigation device is a device which informs the driver of a route to a destination. The navigation device includes an input/output portion inputting or outputting information for guidance of the route, a current position detecting portion detecting information on a current position of the vehicle, a memory in which a map data for calculating the route and a data for guiding the route are stored, and a control portion for searching the route and performing guidance of the route. However, the navigation device that can provide information on a road shape including the gradient of the road to the controller 20 is enough for the exemplary embodiment of the present invention to be executed. Therefore, it is to be understood in this specification and claims that the gradient detector 14 includes any device which can provide the information on the road shape to the controller 20.

The controller 20 determines the short term driving tendency index of the driver based on the data detected by the data detector 10. The short term driving tendency index of the driver may be determined based on how well one or more assumptions related to the driving tendency of the driver are satisfied, and fuzzy control theory may be used to determine the short term driving tendency index of the driver. In addition, the controller 20 performs a starting control based on the short term driving tendency index of the driver and the gradient of the road. That is, the controller 20 controls the transmission 30 or the engine 40 according to the short term driving tendency index and the gradient of the road. In more detail, the controller 20 may change a starting shift-speed, an engine torque map and/or an engine torque filter according to the short term driving tendency index and the gradient of the road. For these purposes, the controller 20 can be realized by one or more processors activated by a predetermined program, and the predetermined program can be programmed to perform each step of a method of controlling starting according to an exemplary embodiment of the present invention.

Meanwhile, the short term driving tendency index means an index related to the driving tendency of the driver but does not necessarily mean the index related to the driving tendency of the driver for a comparatively short time.

Figure 2:
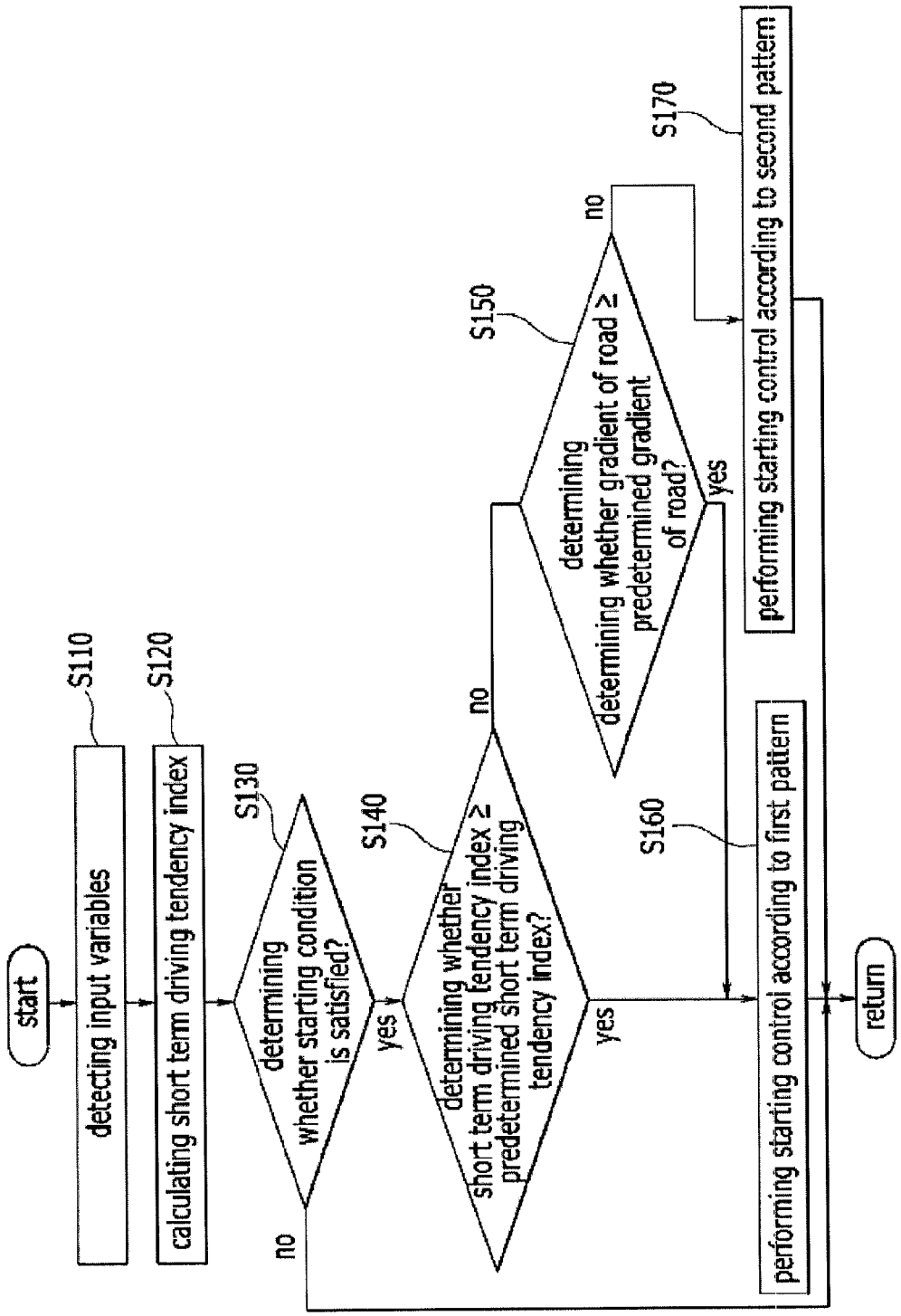
FIG. 2 is a flowchart of a method of controlling starting of a vehicle according to an exemplary embodiment of the present invention.
Figure 3:
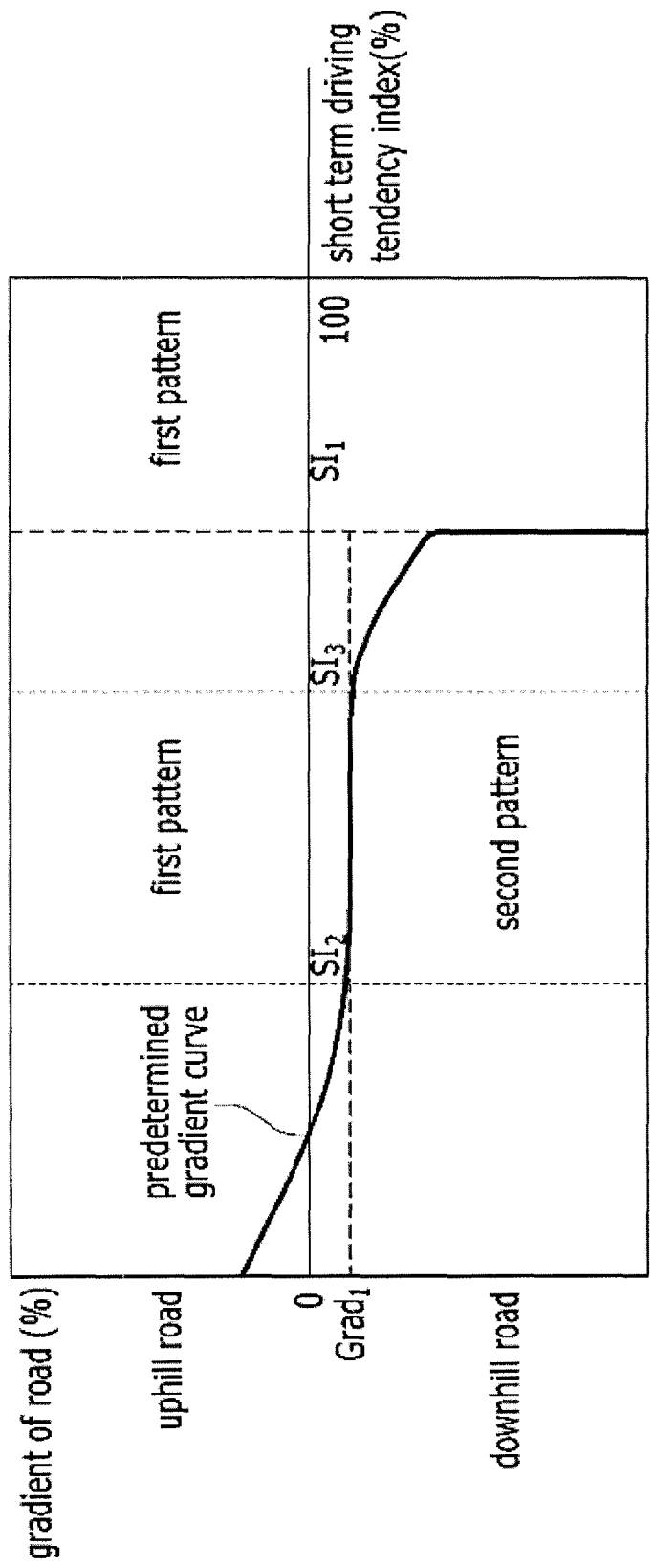
FIG. 3 is a graph of a predetermined gradient according to a short term driving tendency index.

Referring to FIG. 2 to FIG. 4, a method of controlling starting of a vehicle according to an exemplary embodiment of the present invention will hereinafter be described in detail.

FIG. 2 is a flowchart of a method of controlling starting of a vehicle according to an exemplary embodiment of the present invention, FIG. 3 is a graph of a predetermined gradient according to a short term driving tendency index, and FIG. 4 is a table of starting patterns according to an exemplary embodiment of the present invention.

As shown in FIG. 2, the method of controlling starting according to the exemplary embodiment of the present invention begins with detecting the input variables at step S110. That is, the accelerator pedal position sensor 11 detects the position of the accelerator pedal, the vehicle speed sensor 12 detects the vehicle speed, the acceleration detector 13 detects the acceleration of the vehicle, and the gradient detector 14 detects the gradient of the road. In addition, the accelerator pedal position sensor 11, the vehicle speed sensor 12, the acceleration detector 13, and the gradient detector 14 transmits the information on the input variables to the controller 20.

If the data detector 10 detects and transmits the data to the controller 20, the controller 20 calculates the short term driving tendency index at step S120. That is, the controller 20 calculates the short term driving tendency index of the driver based on how well one or more fuzzy rules related to the driving tendency of the driver are satisfied. Since a method of calculating the short term driving tendency index of the driver is described in Korean Patent Application No. 10-2013-0114692, detailed description thereof will be omitted. In addition, it is to be understood that the entire contents of Korean Patent Application No. 10-2013-00114692 are incorporated herein with reference.

If the short term driving tendency index is calculated, the controller 20 determines whether a starting condition is satisfied at step S130. The starting condition may be satisfied when the vehicle is started after a stopped state of the vehicle maintains for a predetermined time, but is not limited thereto. If the starting condition is not satisfied at the step S130, the method ends.

If the starting condition is satisfied at the step S130, the controller 20 determines whether the short term driving tendency index is larger than or equal to a predetermined short term driving tendency index $SI_1$ (referring to FIG. 3) at step S140. As shown in FIG. 3, if the short term driving tendency index is larger than or equal to the predetermined short term driving tendency index, the driver has very sporty driving tendency. Since such the driver makes much importance of acceleration, the starting control is performed to improve the acceleration regardless of the gradient of the road.

If the short term driving tendency index is larger than or equal to the predetermined short term driving tendency index at the step S140, the controller 20 performs the starting control according to a first pattern at step S160. As shown in FIG. 4, the shift-speed is adjusted to a first forward speed and the engine torque is controlled using a sporty torque map and a sporty torque filter in the starting control according to the first pattern. Herein the torque filter means a slope with which torque increases or decreases to target torque, and the target torques under given conditions are stored in a torque map. In addition, the sporty torque filter $\Delta Tq_1$ is larger than a normal torque filter $\Delta Tq_2$, and a target torque $Tq_1$ obtained from the sporty torque map is larger than that $Tq_2$ obtained from a normal torque map under the same condition. After the controller 20 performs the starting control according to the first pattern, the method ends.

If the short term driving tendency index is smaller than the predetermined short term driving tendency index at the step S140, the controller 20 determines whether the gradient of the road is larger than or equal to a predetermined gradient of the road at step S150. As shown in FIG. 3, the predetermined gradient of the road is set according to the short term driving tendency index of the driver. If the short term driving tendency index SI is within a predetermined region ($SI_2 < SI < SI_3$), the gradient of the road is maintained to be almost a constant gradient $Grad_1$. The constant gradient $Grad_1$ may be a negative value but is not limited to the negative value. In addition, if the short term driving tendency index is not within the predetermined region ($SI < SI_2$ or $SI > SI_3$), the gradient of the road is so set that the predetermined gradient of the road decreases as the short term driving tendency index increases.

If the gradient is the negative value, the road is a downhill road. If the vehicle is started using the sporty torque map and the sporty torque filter on the downhill road, the vehicle is accelerated very quickly and accidents may occur. In order to prevent accidents, the vehicle is started using the normal torque filter and the normal torque map if the gradient is smaller than the predetermined gradient.

If the gradient of the road is larger than or equal to the predetermined gradient of the road at the step S150, the controller 20 performs the starting control according to the first pattern at the step S160. That is, controller 20 controls the shift-speed to be adjusted to the first forward speed and the engine torque using the sporty torque map and the sporty torque filter. After the controller 20 performs the starting control according to the first pattern, the method ends.

If the gradient of the road is smaller than the predetermined gradient of road at the step S150, the controller 20 performs the starting control according to a second pattern at step 170. As shown in FIG. 4, the shift-speed is controlled to be higher than or equal to a second forward speed and the engine torque is controlled using the normal torque map and the normal torque filter in the starting control according to the second pattern. After the controller 20 performs the starting control according to the second pattern, the method ends.

Meanwhile, it is exemplified in this specification but is not limited that the controller 20 performs the starting control according to the short term driving tendency index and the gradient of the road. That is, the controller 20 may perform the starting control according only to the gradient of the road. In this case, the predetermined gradient may be set to be a constant value regardless of the short term driving tendency index of the driver. That is, a predetermined curved line in FIG. 4 is in parallel with a horizontal axis.

At this time, if the gradient of the road is larger than or equal to the predetermined gradient, the controller 20 performs the starting control according to the first pattern. In contrast, if the gradient of the road is smaller than the predetermined gradient, the controller 20 may perform the starting control according to the second pattern.

As described above, since the starting is controller differently according to the short term driving tendency index and the gradient of the road, customer satisfaction related to driving performance may be improved according to the exemplary embodiment of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A system of controlling starting of a vehicle comprising:
   an accelerator pedal position sensor detecting a position of an accelerator pedal;
   a vehicle speed sensor detecting a vehicle speed; and
   a controller receiving information on input variables including the position of the accelerator pedal and the vehicle speed from the accelerator pedal position sensor and the vehicle speed sensor, determining a short term driving tendency index of a driver based on the information, and performing starting control of the vehicle according to the short term driving tendency index.

2. The system of claim 1, further comprising a gradient detector detecting a gradient of a road,
   wherein the controller determines the short term driving tendency index of the driver further considering the gradient of the road and performs the starting control according to the short term driving tendency index and the gradient of the road.

3. The system of claim 2, wherein the controller performs the starting control according to a first pattern when the short term driving tendency index is larger than or equal to a predetermined short term driving tendency index.

4. The system of claim 3, wherein in the first pattern, the controller controls a shift-speed to be adjusted to a first forward speed and an engine torque using a sporty torque map and a sporty torque filter.

5. The system of claim 2, wherein the controller performs the starting control according to a first pattern when the short term driving tendency index is smaller than a predetermined short term driving tendency index and the gradient of the road is larger than or equal to a predetermined gradient of the road.

6. The system of claim 5, wherein in the first pattern, the controller controls a shift-speed to be adjusted to a first forward speed and an engine torque using a sporty torque map and a sporty torque filter.

7. The system of claim 2, wherein the controller performs the starting control according to a second pattern when the short term driving tendency index is smaller than a predetermined short term driving tendency index and the gradient of the road is smaller than a predetermined gradient of the road.

8. The system of claim 7, wherein in the second pattern, the controller controls a shift-speed to be higher than or equal to a second forward speed and an engine torque using a normal torque map and a normal torque filter.

9. The system of claim 7, wherein the predetermined gradient of the road is determined according to the short term driving tendency index.

10. A method of controlling starting of a vehicle comprising:
    detecting input variables;
    determining a short term driving tendency index based on the input variables;
    determining, when a starting condition is satisfied, whether the short term driving tendency index is larger than or equal to a predetermined short term driving tendency index; and
    performing starting control according to a first pattern when the short term driving tendency index is larger than or equal to the predetermined short term driving tendency index.

11. The method of claim 10, further comprising:
    determining whether a gradient of a road is larger than or equal to a predetermined gradient of the road when the short term driving tendency index is smaller than the predetermined short term driving tendency index; and
    performing the starting control according to the first pattern when the gradient of the road is larger than or equal to the predetermined gradient of the road.

12. The method of claim 11, further comprising performing the starting control according to a second pattern when the gradient of the road is smaller than the predetermined gradient of the road.

13. The method of claim 10, wherein the input variables include a position of an accelerator pedal, a change rate of the position of the accelerator pedal, a vehicle speed, and the gradient of the road.

14. The method of claim 11, wherein the predetermined gradient of road is determined according to the short term driving tendency index.

15. A system of controlling starting of a vehicle comprising:
    a gradient detector detecting a gradient of a road; and
    a controller receiving information on the gradient of the road from the gradient detector and performing starting control according to the gradient of the road.

16. The system of claim 15, wherein the controller performs the starting control according to a first pattern when the gradient of the road is larger than or equal to a predetermined gradient.

17. The system of claim 15, wherein the controller performs the starting control according to a second pattern when the gradient of the road is smaller than the predetermined gradient.

* * * * *